United States Patent
Jackson et al.

(10) Patent No.: US 10,329,016 B1
(45) Date of Patent: Jun. 25, 2019

(54) REMOTE AERIAL MANIPULATION PLATFORM

(71) Applicant: StabilVista, LLC, Penhook, VA (US)

(72) Inventors: Ronald D. Jackson, Penhook, VA (US); Donald D. Miller, Oak Brook, IL (US)

(73) Assignee: JAXON Enterprises, Inc., Yemasee, SC (US)

( * ) Notice: Subject to any disclaimer, the term of this patent is extended or adjusted under 35 U.S.C. 154(b) by 36 days.

(21) Appl. No.: 15/243,540

(22) Filed: Aug. 22, 2016

Related U.S. Application Data

(60) Provisional application No. 62/207,629, filed on Aug. 20, 2015.

(51) Int. Cl.
*B64C 39/02* (2006.01)
*B64D 47/08* (2006.01)
*B65H 75/08* (2006.01)
*G05D 1/00* (2006.01)
*G08G 5/00* (2006.01)

(52) U.S. Cl.
CPC ............ *B64C 39/024* (2013.01); *B64D 47/08* (2013.01); *B65H 75/08* (2013.01); *G05D 1/0011* (2013.01); *G08G 5/0069* (2013.01); *B65H 2701/34* (2013.01)

(58) Field of Classification Search
CPC .. H02G 1/02; H02G 1/04; H02G 1/06; H02G 1/08; B64C 2201/128
See application file for complete search history.

(56) References Cited

U.S. PATENT DOCUMENTS

| | | | | |
|---|---|---|---|---|
| 3,586,256 A | * | 6/1971 | Wellman | H02G 1/04 242/156.2 |
| 3,934,854 A | * | 1/1976 | Goode | B65H 54/205 254/134.3 R |
| 3,937,413 A | | 2/1976 | Devine | |
| 4,006,884 A | * | 2/1977 | Lederhos | H02G 1/04 254/134.3 PA |
| 4,328,952 A | * | 5/1982 | Chapman | H02G 1/04 254/134.3 R |
| 4,421,301 A | * | 12/1983 | Chapman | H02G 1/04 254/134.3 R |
| 4,596,379 A | | 6/1986 | Saracini | |
| 5,178,368 A | | 1/1993 | Saracini | |
| 8,156,624 B2 | * | 4/2012 | Gunter | H02G 1/04 248/59 |

(Continued)

FOREIGN PATENT DOCUMENTS

KR    1020050023002    8/2005

*Primary Examiner* — Thomas E Worden
(74) *Attorney, Agent, or Firm* — Charles S. Sara; DeWitt Ross & Stevens S.C.

(57) ABSTRACT

An apparatus and system for placing, or resetting, power line cable to a power support structure, such as a transmission tower includes a remote aerial manipulation platform") utilizing an unmanned aerial vehicle containing a bracket and a rotatable spool attached to the bracket. The spool includes a length of pre-lead line wound on the body of the spool. A reel system on the unmanned aerial vehicle provides appropriate tension to the rotatable spool. A control system enables the transmission of informational messages from the unmanned aerial vehicle to a ground control system.

12 Claims, 8 Drawing Sheets

(56) References Cited

U.S. PATENT DOCUMENTS

| | | | | |
|---|---|---|---|---|
| 8,439,332 B2* | 5/2013 | Gunter | ............... | H02G 1/04 |
| | | | | 248/59 |
| 8,648,254 B2* | 2/2014 | Venne | ............... | H02G 1/04 |
| | | | | 174/152 R |
| 9,162,753 B1* | 10/2015 | Panto | ............... | B64C 19/00 |
| 9,459,620 B1* | 10/2016 | Schaffalitzky | ....... | G05D 1/0016 |
| 9,487,356 B1* | 11/2016 | Aggarwal | ............ | B65G 1/1373 |
| 2009/0039325 A1* | 2/2009 | Gunter | ............... | H02G 1/04 |
| | | | | 254/134.3 R |
| 2012/0152654 A1* | 6/2012 | Marcus | ............... | A62B 5/00 |
| | | | | 182/129 |
| 2012/0199799 A1* | 8/2012 | Gunter | ............... | H02G 1/04 |
| | | | | 254/134.5 |
| 2012/0226394 A1* | 9/2012 | Marcus | ............... | A62B 5/00 |
| | | | | 701/2 |
| 2015/0158587 A1* | 6/2015 | Patrick | ............ | B64C 39/024 |
| | | | | 244/137.4 |
| 2016/0023761 A1* | 1/2016 | McNally | ............ | B64C 39/024 |
| | | | | 29/407.01 |
| 2016/0159606 A1* | 6/2016 | Smith | ............ | B65H 49/32 |
| | | | | 242/533.8 |
| 2016/0236778 A1* | 8/2016 | Takayama | ............ | B64D 1/12 |

* cited by examiner

REMOTE AERIAL MANIPULATION PLATFORM

CROSS-REFERENCE TO RELATED APPLICATION

The application claims priority to U.S. Provisional Application entitled "REMOTE AERIAL MANIPULATION PLATFORM," Ser. No. 62/207,629, filed Aug. 20, 2015, which is incorporated herein by reference in its entirety.

FIELD OF THE INVENTION

The present invention is directed to a system for placing, or resetting, power line conductors to a power support structure, such as a transmission tower by means of a remote aerial manipulation platform ("RAMP") utilizing small-unmanned aerial vehicles ("UAV").

BACKGROUND OF THE INVENTION

The purpose of this invention is to solve the problem of the high costs, extreme hazard to safety and time consumption that is incurred with the initial placement of, or resetting of, power line conductors to their supporting structures, such as a transmission tower, that span areas, which prevent the construction process from using ground equipment. A power line conductor is typically a metal wire-shaped material that allows the flow of an electrical current in one or more directions. A transmission tower is typically a very tall usually a steel lattice tower which purpose serves to support an overhead power line conductor.

Currently, this is accomplished by utilizing helicopters when a span is to be constructed over inhospitable or unmanageable terrain. Reference is made to U.S. Pat. No. 4,421,301 for such a disclosure. The methods used have traditionally been hazardous to the ground crews as well as the pilot. Linemen would have to scale the transmission tower structures or poles to help receive the "sock line." The sock line is a preliminary stringing line typically unrolled from a large spool supported on the ground at one end of a series of transmission towers. A typical sock line may be stranded cables of strong lightweight materials, such as steel, nylon or polyethylene. The sock line is strung through cable-stringing blocks or receivers attached to transmission towers along the entire length of the series of the transmission towers. Installation of transmission and distribution power conductor cables typically requires a stringing block having a sheave wheel. Stringing blocks typically include a rotatable wheel having a diameter ranging from about 10 inches to about 50 inches, with 16 to 22 inch wheels being most common. Current commercially available cable-stringing blocks use aluminum wheels in an aluminum frame. Reference is made to U.S. Pat. No. 8,398,057 to Tukachinsky and U.S. Pat. No. 6,375,163 to Carlson et al., which are incorporated herein by reference for describes of cable-stringing blocks.

The sock line has an end coupling for connection to an end of a power line. The benefit of the sock line is that it is considerably lighter and easier to manipulate than a power line cable. For that reason, sock lines are used in the initial stringing process. After the sock line is in place, an end of the power line cable is connected to an end of the sock line. The sock line is then pulled through the cable-stringing blocks thereby drawing the power cable line through the cable-stringing block to "string" the power cable line to the transmission towers.

In many instances, the helicopter would pull the sock line suspended from a vertical "long line," sometimes as long as 250 feet. This line is weighted to ensure that the lightweight sock line does not sway too much in the wind. The helicopter pilot would then maneuver the aircraft to place the attached sock line into a receiving carriage attached to the structure and commonly assisted by a lineman on the structure or adjacent lift truck who is subjected to the possibility of falling at great distances and or being struck by the swaying of the attached weight of up to 200 lbs or more. The payout of the sock line is controlled by a brakeman who handles a reel drum from the starting point. If there is inadequate communication or teamwork between the pilot and brakeman, the reel will become too taught, causing flight malfunction, or too slack, causing a backlash in the reel, that has the result of snatching the aircraft out of the sky quickly. All of these incidents have happened in the past resulting in injuries and deaths.

While the current method is more time efficient than performing the operation by ground, it translates into many person-hours combined. The costs incurred can be very large due to the hourly rate of the helicopter operation as well as the cost of person-hours and equipment.

SUMMARY OF THE INVENTION

The present invention is directed to an apparatus and a method for stringing power cables through transmission towers using an unmanned aerial vehicles ("UAV") without the requirement that a person be present on the transmission tower while the UAV strings the power cable through the transmission towers.

Specifically, the present invention is directed to an unmanned aerial vehicle 30 for delivering line to a destination location, comprising a bracket attached to the unmanned aerial vehicle, the bracket including a base and a pair of opposing arms; a rotatable spool attached to the bracket, the spool having a first end, a second end and a body, wherein the spool includes a length of line wound on the body of the spool; a reel system attached to one of the pair of opposing arms of the bracket, wherein the reel system comprises components to provide tension to the rotatable spool; and a control system enabling the transmission of informational messages from the unmanned aerial vehicle to a ground control system.

The present invention is further directed to a system for delivering a line to a distant location, comprising: (1) an unmanned aerial vehicle configured to deliver the line to a destination location, the unmanned aerial vehicle comprising a bracket attached to the unmanned aerial vehicle, the bracket including a base and a pair of opposing arms, a rotatable spool attached to the bracket, the spool having a first end, a second end and a body, wherein the spool includes a length of line wound on the body of the spool, a reel system attached to one of the pair of opposing arms of the bracket, wherein the reel system comprises components to provide tension to the rotatable spool and a control system enabling the transmission of informational messages from the unmanned aerial vehicle to a ground control system; (2) a ground control system for receiving informational message from the unmanned aerial vehicle and for providing information to the unmanned aerial vehicle; and (3) a satellite control system for coordinating the transmission of informational messages from the ground control system to the UAV, wherein the satellite control system provides position, speed and altitude information to the unmanned aerial vehicle via radio control frequency, wherein the unmanned aerial vehicle, in response to receiving informational messages from the ground control system, is configured to navigate to the distant location and deliver the line.

The present invention is further directed to a method for threading pre-lead lines through a series of transmission towers, comprising the steps of: (1) attaching a free end of a pre-lead line from an unmanned aerial vehicle to a ground support, wherein the unmanned aerial vehicle comprises a bracket attached to the unmanned aerial vehicle, the bracket including a base and a pair of opposing arms, a rotatable spool attached to the bracket, the spool having a first end, a second end and a body, wherein the spool includes a length of pre-lead line wound on the body of the spool, a reel system attached to one of the pair of opposing arms of the bracket, wherein the reel system comprises components to provide tension to the rotatable spool and a control system enabling the transmission of informational messages from the unmanned aerial vehicle to a ground control station, and a line tube mounted on the unmanned aerial vehicle, the line tube having a distal end, a proximal end and an internal channel, wherein the line tube provides an extended guide for the length of line from the spool, wherein the line tube includes a camera to enable an operator remotely operating the unmanned aerial vehicle to view external conditions with respect to the unmanned aerial vehicle; (2) installing appropriate location coordinates on the ground control station by an operator; (3) maneuvering the unmanned aerial vehicle to the location of a cable-stringing block on the transmission tower by operator control; (4) positioning the distal end of the line tube guided by the camera to connect the pre-lead line to the cable stringing block; and (5) maneuvering the unmanned aerial vehicle to subsequently cable-stringing blocks for positioning the distal end of the line tube to connect the pre-lead line to subsequent cable stringing blocks.

Advantageously, the present invention allows for the stringing of power lines through a series of transmission towers without the requirement for using manned aircraft and without the requirement of having persons actually on the transmission tower to facilitate the stringing operation.

DETAILED DESCRIPTION OF THE INVENTION

Figure 1:
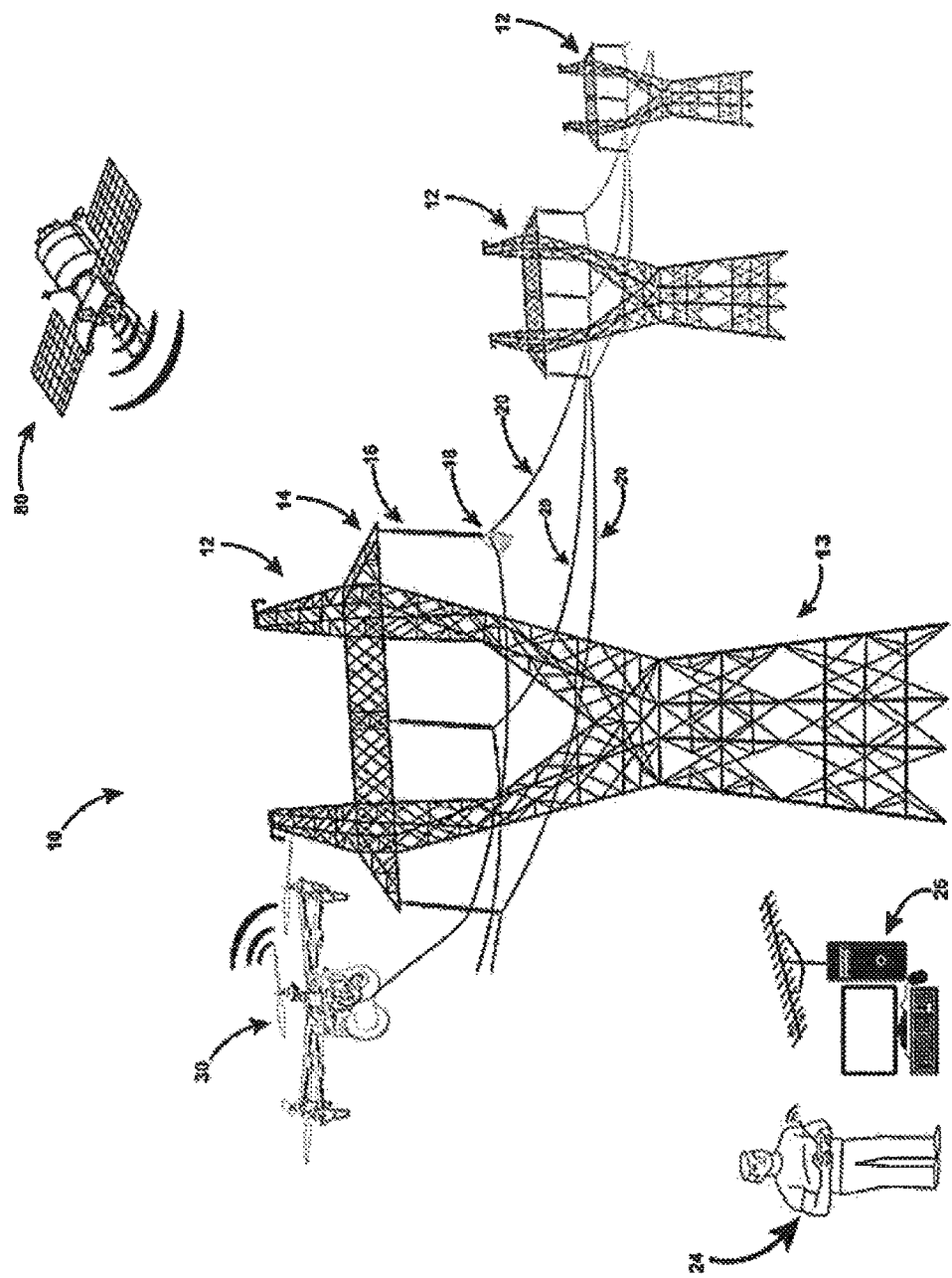
FIG. 1 is a perspective view of a UAV stringing a pre-lead line to cable-stringing block on a series of transmission towers.
Figure 2:
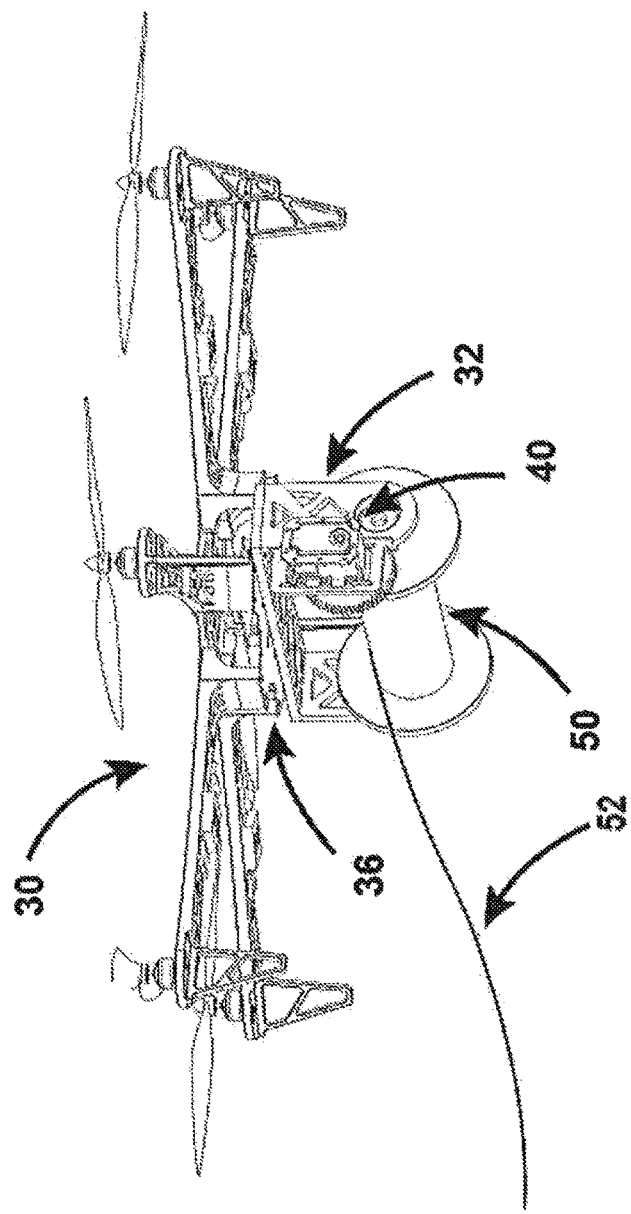
FIG. 2 is a perspective view of a UAV of the present invention.
Figure 3:
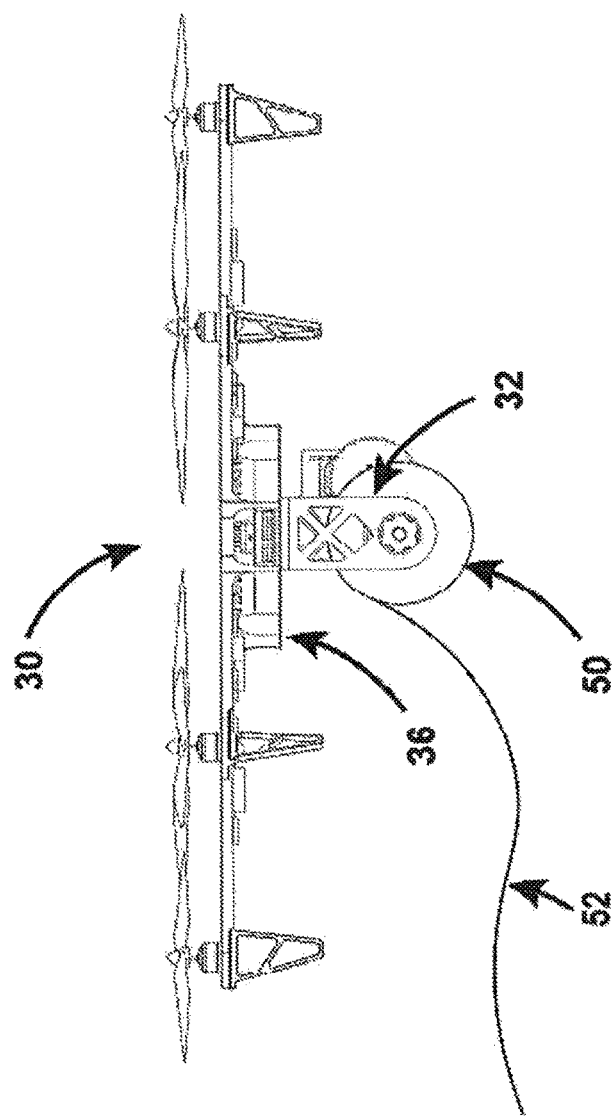
FIG. 3 is a side plan view of the UAV of FIG. 2.
Figure 7:
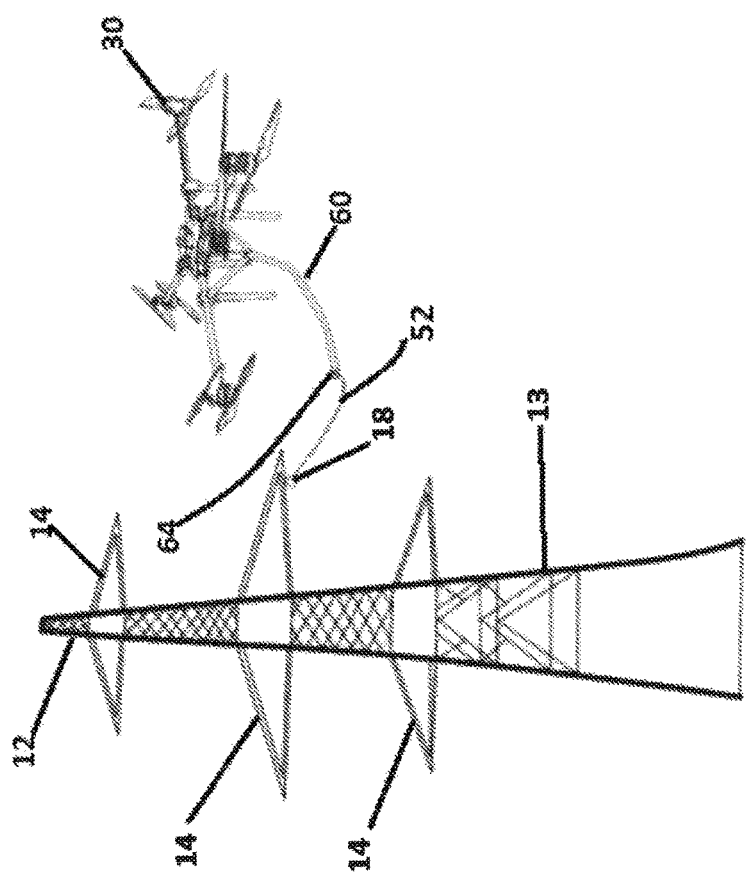
FIG. 7 is a perspective view of a transmission tower and UAV illustrating the attachment of the pre-lead line to a cable-stringing block on the structure arm of the transmission tower.
Figure 8:
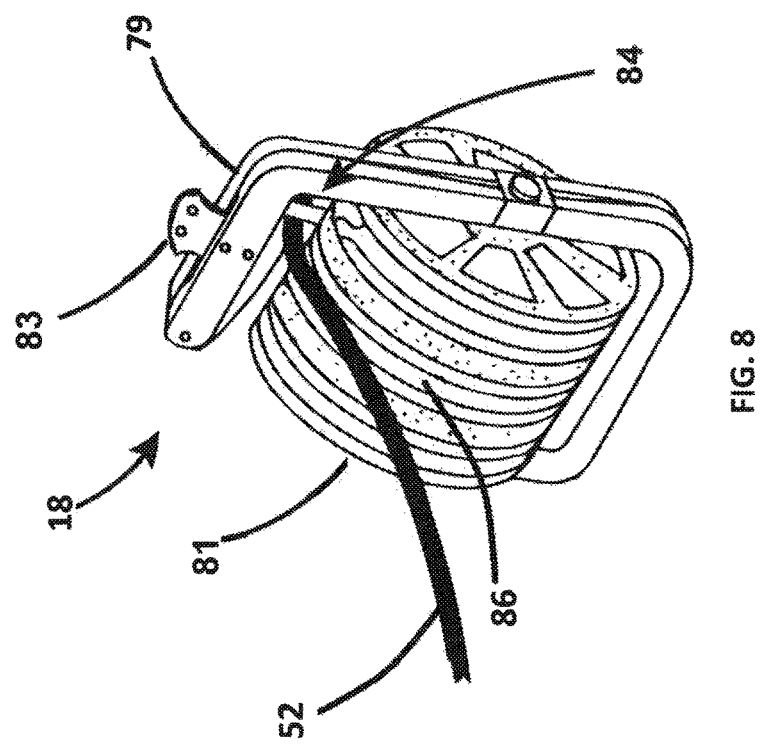
FIG. 8 is a perspective view of an embodiment of a cable-stringing block.

The concept of the present invention is to simplify a power line stringing operation 10, as illustrated in FIG. 1, and alleviate the need for personnel on each transmission tower 12 and to improve safety, cost and efficiency by eliminating the use of a manned helicopter for the operation. The transmission towers 12 typically include a vertical post 13, structure arms 14, insulators 16, and conductor stringing blocks or receivers 18 attached to the transmission towers 12 to receive and facilitate the power line 20 passage. As illustrated in FIGS. 1 and 8, the cable-stringing block 18 is designed to be mounted directly on the structure arm 14, as illustrated in FIG. 7, or hanging from the insulators 16, as illustrated in FIG. 1. The cable-stringing block 18 includes a block frame 79 designed to rotatably hold a sheave 81. The block frame 79 includes an arm mount 83 for connecting the cable-stringing block 18 to the transmission tower 12. A line guide 84 assists in placement of the pre-lead line 52 on the cable-stringing block 18.

Unmanned Aerial Vehicle 30

The present invention involves the utilization of a small-unmanned aerial vehicle ("UAV") 30, illustrated in FIGS. 1, 2, 3, 6 and 7 for stringing a line to a series of transmission towers 12 disposed at spaced intervals as illustrated in FIG. 1. UAVs 30 are known to the industry, including multirotor or single rotor models that can complete the required steps. The version illustrated in the drawings is a quadcopter. A UAV 30 is an aircraft operated without a human pilot. It is typically operated under remote control by an operator 24 and by onboard computers. The UAV 30 can be constructed of any material that will allow sufficient strength to operate. While size is not a criterion with respect to the UAV 30, it is expected that the UAV 30 be at least large enough to accomplish the mission described herein.

The UAV 30 is unique due to the implementation of a constant tension reel system 40, spool 50 and line tube 60 extension that guides a light weight line 52, referred to herein as a "pre-lead line," into the cable-stringing blocks 18 attached to the structure arms 14 on the transmission tower 12. Unlike the prior art system, which strings a sock line from directly from a ground reel through a cable-stringing block 18 on the transmission tower 12, the present invention incorporates the UAV 30 to thread a pre-lead line 52 through the transmission towers' cable-stringing blocks 18. As will be described below, one end of the pre-lead line 52 is then attached to an end of the sock line wound to a ground reel (not illustrated). As the pre-lead line 52 is drawn through the cable-stringing blocks 18, the sock line is then pulled through the cable-stringing blocks 18. Once the sock line is positioned through the cable-stringing blocks 18, one end of the sock line is connected to a power line 20 by means known to the art for threading the power line 20 through the cable-stringing blocks 18.

Reel System 40 and Spool 50

As illustrated in FIGS. 2-5, the UAV 30 of the present invention is adapted to be fitted with a U-shaped bracket 32 have a base 34 for attachment to the lower surface or payload area 36 of the UAV 30 and arms 38 for receiving the lightweight constant tension reel system 40 and spool 50. As illustrated, the reel system 40 and spool 50 are preferably horizontally positioned with the bracket 32. However, it is within the scope of the present invention to place the spool 50 in vertical alignment with respect to the payload area 36 of the UAV 30 as illustrated in FIG. 6.

Spool 50

The spool 50 is designed to be adjustable in length to accommodate the length of pre-lead filament line 52 as needed. In this manner, the bracket 32 can be adjustable in length or interchangeable to adapt to a spool 50 of a different length. By increasing the length of the spool 50, a longer length of pre-lead line 52 can be added or a different grade of pre-lead line 52 could be added. As the pre-lead line 52 increases in thickness, a longer spool 50 may be required to include the requisite length of pre-lead line 52.

The spool 50 includes a first end 51, a second end 53 and a substantially cylindrical body 55. The body 55 of the spool 50 can be preloaded with pre-lead line 52 between the extended first and second ends 51, 53 if desired. The spool 50 is connected, typically being snap fit, into the arms 38 of the bracket 32. The spool 50 is designed to be easily removable for quick interchangeability.

The bracket 32 with reel system 40 and spool 50 can be mounted on any type of UAV 30 in production that is capable or that can be made capable of accepting the mounted reel system 40 and line and able to carry the payload. This would include octocopter, hexcopter, quadcopter or remotely controlled or guided helicopter or dirigible.

Pre-Lead Line 52

The pre-lead line 52 is used to guide the actual sock line, lead line or tag line through the cable-stringing blocks 18 on the transmission towers 12. The pre-lead line 52 is preferably comprised of any material that would be non-twist and with a strength of 200-500 pounds as needed.

The spool 50 is preferably designed to contain at least 2,500 feet of lightweight braided monofilament type line rated to at least 300 pounds although, as described above, the spool 50 can be lengthened (or shortened) to increase or decrease the length of pre-lead line 52 needed. Three thousand (3000) feet of 300 lb. braided monofilament pre-lead line 52 weighs approximately 6 lbs. Five (5) miles of common nylon/Kevlar® sock line weighs approximately 99 lbs.

The UAV 30 would only have to carry the load of the pre-lead line 52. The pre-lead line 52 is designed to be of sufficient strength to pull the sock line through the cable-stringing blocks 18.

Constant Tension Reel System 40

Figure 4:
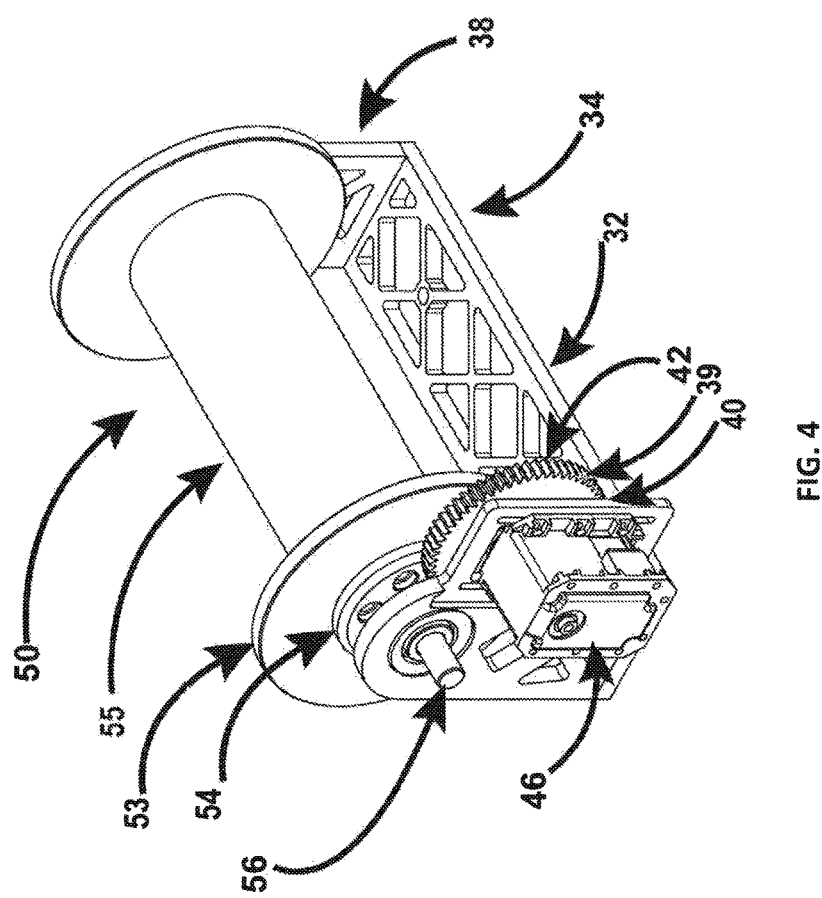
FIG. 4 is a front perspective view of the real and spool system for attachment to the UAV of the FIG. 2.
Figure 5:
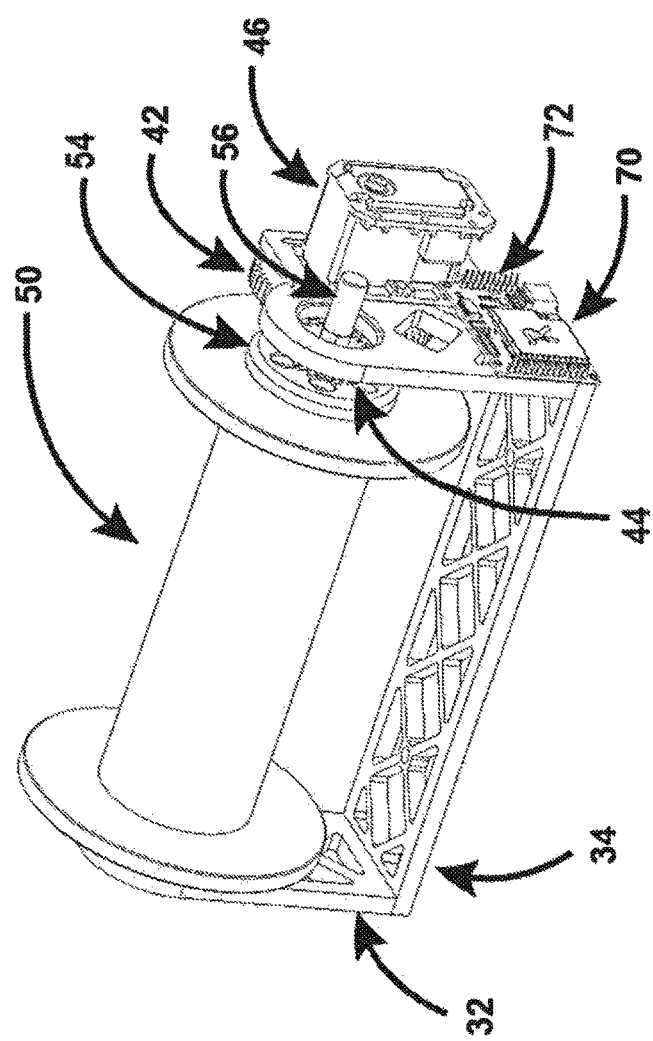
FIG. 5 is a rear perspective view of the real and spool system of FIG. 4.
Figure 6:
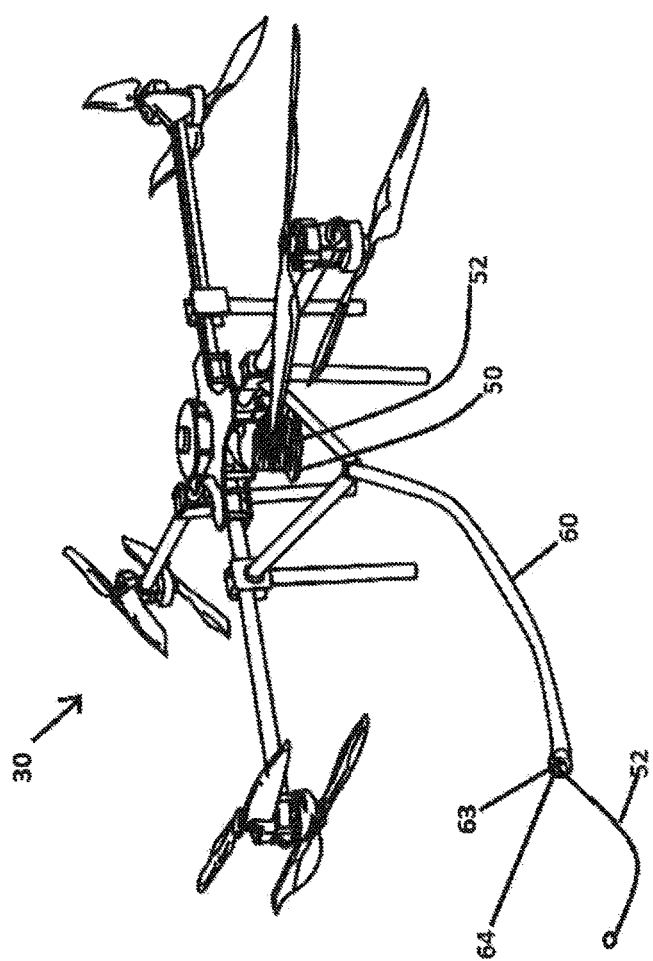
FIG. 6 is a perspective view of the UAV of the present invention with the line tube attached.

As illustrated in FIGS. 4 and 5, the constant tension reel system 40 is connected to the bracket 32 and is designed to place constant pressure on the spool 50 in order to prevent the pre-lead line 52 wound on the spool 50 to unravel independently as described below. The constant tension reel system 40 is further designed to keep the pre-lead line 52 and the UAV 30 under control instead of allowing the pre-lead line 52 to freely spool or be released from the spool 50 attached to the UAV 30. This allows precise placement of the pre-lead line 52 regardless of the speed of the UAV 30.

The reel system 40 includes a bearing structure 54 in concert with an axle 56 on both ends of the spool 50, known to the art to provide very low friction heat to enable the UAV 30 to fly relatively fast with little or no load on the spool 50 if necessary. The purpose for this is to allow the pre-lead line 52 to withdraw from the spool 50 as needed but without unwanted slack or tension, which could disrupt the flying maneuvers of the UAV 30. For example, excess slack could fall into the tree canopy or the environment below the UAV 30, which of course is undesirable.

Referring to FIGS. 4 and 5, the reel system 40 is illustrated as being primarily driven by a gear system 39 mounted on one side of the bracket 32. The gear system 39 includes a primary gear 42, a secondary gear 44 connected to the spool 50 and a servomotor 46. The primary gear 42 is activated by the servomotor 46 to drive the secondary gear 44, which then rotates or holds the spool 50. Essentially, the gear system 39 is desired to provide a reduction from the servomotor 46 to the spool 50 to allow the servomotor 46 to then control it. The servomotor 46 is preferably mounted to drive the spool 50 directly without gearing. Depending on the servomotor 46 used, direct drive or gear reduction will work either way.

While the reel system 40 and spool 50 are is preferably mounted on a UAV 30 as illustrated, it is within the scope of the present invention to mount the reel system 40 and spool 50 on the ground with the UAV 30 pulling the pre-lead line 52 only. The reel system 40 and spool 50, coupled with the programmable servomotor 46, spools out and reels in the pre-lead line 52 consistent with the speed and direction of travel of the UAV 30. The bracket 32, spool 50 and reel system 40 can be constructed of any material that will also sufficient strength to operate, such as aluminum or a polymer.

Servomotor 46

The servomotor 46 is designed to be adjusted to provide a constant tension on the reel system 40 and spool 50, both clockwise and counterclockwise. The servomotor 46 operates the reel system 40 in a manner to reduce slack and maintain a constant tension. Representative examples of servomotors include brushless motors or permanent magnet DC ("PMDC") motors coupled with any manner or type of sensor, driver controller or encoder that will allow controlled operation of the reel system 40. Motors or power sources useful in the operation are known to the industry. A non-limiting example of a motor is a 12 volt Robotis Dynamixel, model MX28 model. Other types and sizes of motors can be used as long as the motor has certain characteristics, i.e., they communicate over serial, and the motor has internal sensors and controls to enable operation from an external source.

The servomotor 46 is designed to include several sensors, which are positioned to monitor the amount of pre-lead line 52 or the amount of spool rotations in order to determine the length of pre-lead line 52 metered from the spool 50. The servomotor 46 drive also includes a torque-sensing component to monitor the load on the actual pre-lead line 52. The torque-sensing component includes a feature for locking the spool 50 to prevent line feed or line take up. Alternatively, the torque-sensing component enables a slow or quick release of the pre-lead line 52 or the slow or quick retraction of the pre-lead line 52 if slack should develop in the pre-lead line 52. If the pre-lead line 52 "softens," indicating too much slack, the torque-sensing component causes the servomotor 46 to retract the pre-lead line 52 until there is appropriate tension. Additionally, if the UAV 30 retreats or moves backwards, the sensor acknowledges that and retracts the pre-lead line 52 to prevent the pre-lead line 52 from sagging and possibly snagging in a tree for example.

The servomotor 46 is typically equipped with an encoder to sense position of the gear, an in-line torque-sensing component to monitor the present load or any given load off the servomotor 46 and an internal proportional integral derivative ("PID") control loops to enable the operator 24 to define the speed of the UAV 30 and to be able to control it. The servomotor 46 is programmable with a microprocessor, known to the art, and sensors connected to the microprocessor for communication over serial.

Micro Controller 70

A micro controller 70 accompanies the UAV 30. The micro controller 70 is preferably a single board computer ("SDC") with optional General Purpose Input and Output ("GPIO"), known to the art. With this capability, data can be extracted from the UAV 30 and processed for delivery back to the servomotor 46. For example if the servomotor 46 comes under high tension due to the movement of the UAV 30, the micro controller 70 detects this anomaly. If the UAV 30 is moving faster than the servomotor 46 can feed the pre-lead line 52, the micro controller 70 is programmed to shut down the servomotor 46 so it will free wheel and then monitor just the torque until recovery is possible. Therefore, the micro controller 70 has the ability to evaluate based on two sources: the UAV 30 and the servomotor 46. The micro controller 70 evaluates altitude, via an altitude sensor, ground speed or GPS change in position thereby adding to the system.

Line Tube 60

The free end of the pre-lead line 52 is passed through a line tube 60 that will be mounted to the UAV 30 as illustrated in FIGS. 1, 6 and 7. The line tube 60 is an extended hollow tube with an internal channel large enough to permit free passage of the pre-lead line 52 as illustrated in FIG. 6. The line tube 60 is rigid in structure and preferably constructed of carbon fiber material, although it can also be made of metals or other plastics. This creates the advantage of paying out the lead pre-lead line 52 from the UAV 30 reducing snag hazard as well as reducing sag. This also ensures that a known weight of pre-lead line 52 is being carried. At the end of the line tube 60 is a camera 62, preferably a high definition first person view ("FPV") camera, which enables the operator 24 to view the position of the UAV 30 with respect to the transmission tower 12 and, more importantly, the position of the pre-lead line 52 with respect to the cable-stringing block 18 on the structure arm 14 of the transmission tower 12. The pre-lead line 52 is fed through the line tube 60 that allows the UAV 30 to autonomously place the pre-lead line 52 into the cable-stringing block 18 suspended from the structure arm 14 of the transmission tower 12.

GPS Satellite 80

A GPS satellite 80 coordinates transmission of messages from the micro controller 70 located on the UAV 30 with the ground control station 26. The GPS satellite 80 provides position, speed and altitude information to the UAV 30 as with all UAV's, aircraft, ground vehicles etc. Information to and from the UAV 30 and Ground control station 26 is transmitted via radio control frequency and WiFi signal.

Ground Control Station 26

The UAV 30 is equipped with a wireless module for communication, i.e., a WiFi transmitter 72 to the ground control station 26, such as a laptop, in order to receive instructions from the operator 24. The ground control station 26 provides necessary information from the UAV 30 in the sky to keep the operator 24 aware of the current functions of the UAV 30, the UAV servomotor 46 and the action of the spool 50. The ground control station 26 correlates the UAV 30 position as well as other necessary data. The ground control station 26 also allows the operator 24 to control the actions of the UAV 30. For example, the operator 24 can program additional pre-lead line 52 pay out as necessary. The ground control station 26 also provides the operator 24 sufficient controls to fly and land the UAV 30. The ground control station 26 is a standard computer program known to the art. An exemplary ground control station 26 software program is called Mission Planner (http://ardupilot.org/planner/docs/mission-planner-overview.html). Mission Planner is a ground control station known to the art for use in airplanes, helicopters and rover systems. Mission Planner can be used as a configuration utility or as a dynamic control supplement for the UAV 30. A representative example of a ground control system is an ArbotiX-M Robocontroller Item # IL-ARBOTIXM (Vanadium Labs LLC Averill Park, N.Y.). An operator 24 controls the ground control station 26.

The ground control station 26 is a known system including radio control elements, laptop computer elements, digital data readouts and WiFi, GPS and radio control antenna combined in a case for rugged outdoor use. The Mission Planner software is installed on the computer. The Mission planner software is designed to allow the operator 24 to input and receive output of desired control series as well as take manual control of the UAV 30 if needed. The AirbtiX-M system is a programmable robotics module that is installed in the UAV 30 and programmed to "talk" to the reel system 40 and supply speed, torque and altitude information and to send feedback to the ground control station 26.

Any laptop computer or similar device and any mission type planning software can be used to program the UAV 30 and reel system 40.

Operation:

Referring to FIGS. 1, 7 and 8, the operation of the system follows this preferred pattern. The conductor sock line is positioned on a ground reel (not illustrated) typically supplied by a power company. The conductor power line 20 is also positioned for use. Cable-stringing blocks 18 are hung on the insulators 16 attached to structure arms 14 of the transmission towers 12.

The free end of the UAV 30 pre-lead line 52, which is wound on the spool 50, is attached to the conductor sock line (not illustrated). The UAV 30 is prepared for takeoff. Coordinates are inserted in the ground control station 26. The UAV 30 is maneuvered by the action of the operator 24 working with the ground controller station 26 to the first cable-stringing block 18 on the first transmission tower 12. The UAV 30 can be manually flown to manipulate the pre-lead line 52 into the cable-stringing blocks 18 or set to fly autonomously via radio, laser or beacon guidance to the reel system 40.

The operator 24 maneuvers the UAV 30 to the vicinity of the first cable-stringing block 18 utilizing one side of a split FPV screen at the ground control station 26. This view is provided by the HD UAV mounted camera 62 and transmitted via HD downlink according to methods known to the art. When approaching the cable-stringing block 18, the operator 24 transfers attention to the split screen provided by the line tube 60 mounted HD camera 62 also sent via HD downlink. The operator 24 then manipulates the UAV 30 in a manner guide the distal end 63 of the line tube 60 via the camera 62 to come in contact with the rotating sheave 81 on the cable-stringing block 18 at the location of the line guide 84. The pre-lead line 52 is placed on a groove 86 embedded in the sheave 81 via the line guide 84 according to methods known to the art. The operator 24 then continues to the other cable-stringing blocks 18 on adjacent transmission towers 12 and the process is repeated until the end point is reached or until the spool 50 of pre-lead line 52 in the UAV 30 is exhausted.

At that time, the operator 24 remotely issues instructions for the return of the UAV 30 and the pre-lead line 52 is secured to a retrieval reel (not illustrated) and, if needed, the spool 50 on the UAV 30 can be replaced to continue. In addition, the reel system 40 feeds information to the ground control station 26 that measures the amount of pre-lead line 52 paid out in the process. Also, in the event of flight failure of the UAV 30, the reel system 40 will lock and suspend the UAV 30 from a cable-stringing block 18 to allow a controlled descent to the ground to improve safety. To facilitate this operation on both sides of the structure, the line tube 60 is designed to rotate to or replaced to the opposite side of the UAV 30.

After the pre-lead line 52 is fed through all cable-stringing blocks 18, the pre-lead line 52 is pulled or drawn through the multiple cable-stringing blocks 18. Because the sock line is attached to the pre-lead line 52, the sock line is then pulled through all of the now-connected cable-stringing blocks 18. Once the sock line has been threaded through the cable-stringing blocks 18, a free end of the sock line is connected to a free end of a power line 20 for threading the power line 20 through the cable-stringing blocks 18.

This operation, method or process can be used to transfer a light pre-lead line 52 to any location to aid in the retrieval of a heavier line or cable. While this operation has been described with respect to the stringing of a power line 20 on a cable-stringing block 18 on a transmission tower 12, there are many potential uses for the UAV of the present invention. Non-limiting examples include ship to ship for towing or resupply, bridge construction, ski lifts and cable cars, telecommunication lines, and cable television lines.

Any version of any component or method step of the invention may be used with any other component or method step of the invention. The elements described herein can be used in any combination whether explicitly described or not.

All combinations of method steps as used herein can be performed in any order, unless otherwise specified or clearly implied to the contrary by the context in which the referenced combination is made.

As used herein, the singular forms "a," "an," and "the" include plural referents unless the content clearly dictates otherwise.

Numerical ranges as used herein are intended to include every number and subset of numbers contained within that range, whether specifically disclosed or not. Further, these numerical ranges should be construed as providing support for a claim directed to any number or subset of numbers in that range. For example, a disclosure of from 1 to 10 should be construed as supporting a range of from 2 to 8, from 3 to 7, from 5 to 6, from 1 to 9, from 3.6 to 4.6, from 3.5 to 9.9, and so forth.

All patents, patent publications, and peer-reviewed publications (i.e., "references") cited herein are expressly incorporated by reference in their entirety to the same extent as if each individual reference were specifically and individually indicated as being incorporated by reference. In case of conflict between the present disclosure and the incorporated references, the present disclosure controls.

The devices, methods, compounds and compositions of the present invention can comprise, consist of, or consist essentially of the essential elements and limitations described herein, as well as any additional or optional steps, ingredients, components, or limitations described herein or otherwise useful in the art.

While this invention may be embodied in many forms, what is described in detail herein is a specific preferred embodiment of the invention. The present disclosure is an exemplification of the principles of the invention is not intended to limit the invention to the particular embodiments illustrated. It is to be understood that this invention is not limited to the particular examples, process steps, and materials disclosed herein as such process steps and materials may vary somewhat. It is also understood that the terminology used herein is used for the purpose of describing particular embodiments only and is not intended to be limiting since the scope of the present invention will be limited to only the appended claims and equivalents thereof.

The invention claimed is:

1. An unmanned aerial vehicle for delivering a pre-lead line to a destination location, comprising:
   a. a bracket attached to the unmanned aerial vehicle, the bracket including a base and a pair of opposing arms;
   b. a rotatable spool attached to the bracket, the spool having a first end, a second end, and a body, wherein the spool includes a length of pre-lead line wound on the body of the spool, wherein a conductor sock line is connected at one end to a free end of the pre-lead line and another end of the conductor sock line is connectable to a free end of a power line;
   c. a reel system attached to one of the pair of opposing arms of the bracket, wherein the reel system comprises components to provide tension to the rotatable spool and components to drive the rotatable spool;
   d. a line tube mounted on the unmanned aerial vehicle, the line tube having a distal end, a proximal end and an internal channel, wherein the line tube provides an extended guide for the length of pre-lead line from the spool, and wherein the line tube includes a camera to enable an operator remotely operating the unmanned aerial vehicle to view external conditions with respect to the unmanned aerial vehicle; and
   e. a control system enabling the transmission of informational messages from the unmanned aerial vehicle to a ground control system.

2. The unmanned aerial vehicle of claim 1, wherein the reel system components comprise a gear system for controlling tension on the spool to prevent the length of pre-lead line wound on the spool to unravel independently.

3. The unmanned aerial vehicle of claim 2, wherein the gear system comprises a primary gear, a secondary gear connected to the spool, and a servomotor wherein the primary gear is operated by the servomotor to activate the secondary gear.

4. The unmanned aerial vehicle of claim 1, wherein the spool comprises an axle for mounting on the opposing arms of the bracket, wherein the axle includes a bearing structure to allow free rotation of the spool with respect to the opposing arms of the bracket.

5. The unmanned aerial vehicle of claim 1, wherein the spool is releasably attached to the opposing arms of the bracket.

6. The unmanned aerial vehicle of claim 1, wherein the spool is horizontally positioned between the opposing arms of the bracket.

7. The unmanned aerial vehicle of claim 1, wherein the spool is vertically positioned between the opposing arms of the bracket.

8. The unmanned aerial vehicle of claim 1, wherein the body of the spool is substantially cylindrical.

9. A system for delivering a pre-lead line to a distant location, comprising:
   a. an unmanned aerial vehicle configured to deliver the pre-lead line to a destination location, the unmanned aerial vehicle comprising a bracket attached to the unmanned aerial vehicle, the bracket including a base and a pair of opposing arms, a rotatable spool attached to the bracket, the spool having a first end, a second end, and a body, wherein the spool includes a length of pre-lead line wound on the body of the spool, wherein a conductor sock line is connectable at one end to a free end of the pre-lead line and another end of the conductor sock line is connected to a free end of a power line, a reel system attached to one of the pair of opposing arms of the bracket, wherein the reel system comprises components to provide tension to the rotatable spool and components to drive the rotatable spool, a line tube mounted on the unmanned aerial vehicle, the line tube having a distal end, a proximal end, and an internal channel, wherein the line tube provides an extended guide for the length of pre-lead line from the spool, and wherein the line tube includes a camera to enable an operator remotely operating the unmanned aerial vehicle to view external conditions with respect to the unmanned aerial vehicle, and a control system enabling the transmission of informational messages from the unmanned aerial vehicle to a ground control system;

b. a ground control system for receiving informational message from the unmanned aerial vehicle and for providing information to the unmanned aerial vehicle; and c. a satellite control system for coordinating the transmission of informational messages from the ground control system to the UAV, wherein the satellite control system provides position, speed, and altitude information to the unmanned aerial vehicle via radio control frequency;

wherein the unmanned aerial vehicle, in response to receiving informational messages from the ground control system, is configured to navigate to the distant location and deliver the pre-lead line.

10. The system of claim 9, wherein the reel system components comprise a gear system for controlling tension on the spool to prevent the length of pre-lead line wound on the spool to unravel independently and wherein the gear system comprises a primary gear, a secondary gear connected to the spool, and a servomotor wherein the primary gear is operated by the servomotor to activate the secondary gear.

11. The system of claim 9, wherein the spool comprises an axle for mounting on the opposing arms of the bracket, wherein the axle includes a bearing structure to allow free rotation of the spool with respect to the opposing arms of the bracket.

12. A method for threading pre-lead lines through a series of transmission towers, comprising the steps of:

a. attaching a free end of a pre-lead line from an unmanned aerial vehicle to a ground support, wherein the unmanned aerial vehicle comprises a bracket attached to the unmanned aerial vehicle, the bracket including a base, a pair of opposing arms, a rotatable spool attached to the bracket, the spool having a first end, a second end, and a body, wherein the spool includes a length of pre-lead line wound on the body of the spool, wherein a conductor sock line is connected at one end to a free end of the pre-lead line and another end of the conductor sock line is connectable to a free end of a power line, a reel system attached to one of the pair of opposing arms of the bracket, wherein the reel system comprises components to provide tension to the rotatable spool and components to drive the rotatable spool, a control system enabling the transmission of informational messages from the unmanned aerial vehicle to a ground control station, and a line tube mounted on the unmanned aerial vehicle, the line tube having a distal end, a proximal end and an internal channel, wherein the line tube provides an extended guide for the length of line from the spool, and wherein the line tube includes a camera to enable an operator remotely operating the unmanned aerial vehicle to view external conditions with respect to the unmanned aerial vehicle;

b. installing appropriate location coordinates on the ground control station by an operator;

c. maneuvering the unmanned aerial vehicle to the location of a cable-stringing block on the transmission tower by operator control;

d. positioning the distal end of the line tube guided by the camera to connect the pre-lead line to the cable stringing block; and e. maneuvering the unmanned aerial vehicle to subsequent cable-stringing blocks for positioning the distal end of the line tube to connect the pre-lead line to subsequent cable stringing blocks.

* * * * *